United States Patent [19]
Townshend

[11] 3,951,477
[45] Apr. 20, 1976

[54] MOUNTING ARRANGEMENTS
[75] Inventor: Maurice Philip Townshend, Castle Cary, England
[73] Assignee: Plessey Handel und Investments A.G., Zug, Switzerland
[22] Filed: Nov. 26, 1974
[21] Appl. No.: 527,481

[30] Foreign Application Priority Data
Nov. 27, 1973 United Kingdom............ 54991/73

[52] U.S. Cl. .................................. 308/22; 308/26; 248/350; 248/358 R; 267/136
[51] Int. Cl.² ...................... F16C 9/00; F16F 15/08
[58] Field of Search ............... 308/15, 22, 26, 36.1; 248/350, 358 R; 267/136

[56] References Cited
UNITED STATES PATENTS
2,179,959  11/1939  Schroedter................ 248/358 R X
2,393,071  1/1946   Scaelchlin...................... 248/358 R
2,749,160  6/1956   Cowles...................... 248/358 R X
3,296,694  1/1967   De Mastry et al. ......... 248/358 R X FOREIGN PATENTS OR APPLICATIONS
879,754  10/1961  United Kingdom................ 308/36.1
627,869  8/1949   United Kingdom............ 248/358 R
327,411  3/1958   Switzerland......................... 267/136

Primary Examiner—Robert S. Ward, Jr.
Attorney, Agent, or Firm—Fleit & Jacobson

[57]   ABSTRACT

A mounting arrangement comprises a pair of opposed cone surfaces supported on a common axis of a first part of said arrangement, each of said cone surfaces being provided with resilient means for supporting therebetween a second part of said arrangement which is provided with opposed cone shaped depressions which afford bearing surfaces corresponding to said cone surfaces.

6 Claims, 1 Drawing Figure

U.S. Patent April 20, 1976 3,951,477
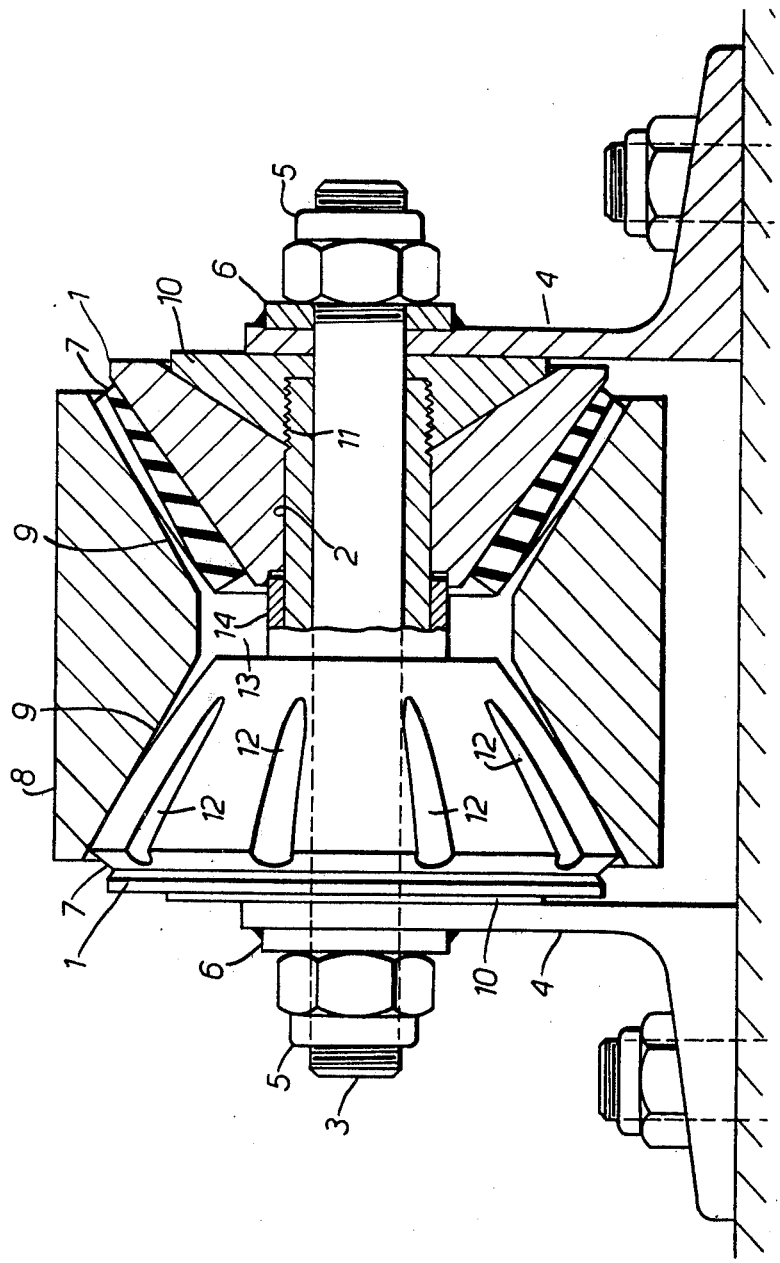

MOUNTING ARRANGEMENTS

This invention relates to mounting arrangements and relates more especially to anti-vibration mounting arrangements which may be used in air or under-water conditions.

According to the present invention there is provided a mounting arrangement comprising a pair of opposed cone surfaces supported on a common axis of a first part of said arrangement, each of said cone surfaces being provided with resilient means for supporting therebetween a second part of said arrangement which is provided with opposed cone shaped depressions which afford bearing surfaces corresponding to said cone surfaces.

In carrying out the invention each of the resilient means may take the form of a sleeve, preferably of elastomeric material, covering the associated cone surface, and in a preferred arrangement the angle subtended by the two cone surfaces will be less than the angle subtended by the two bearing surfaces, the thickness of the sleeves being substantially constant.

In order to make the mounting arrangement suitable for underwater applications the sleeves may be provided with longitudinal flutes for allowing entry to and exit from an interior cavity of said arrangement.

In one arrangement according to the invention the cone surfaces may be afforded by two cone members carried by a shaft which is supported preferably in double shear by one or more support brackets, the second part of said arrangement being of annular form and supported between the cone members.

Conveniently the cone members may be spaced apart by means of a hub member carried by said shaft, the hub member being provided with an insulating sleeve for underwater applications to reduce the possibility of undesirable electrolytic action taking place.

An exemplary embodiment of the invention will now be described with reference to the accompanying drawing which is a part sectional side view of a mounting arrangement according to the present invention.

The mounting arrangement shown in the drawing consists of a pair of opposed cones 1 of rigid plastics material mounted on a steel hub 2, the hub 2 being carried by steel shaft 3 which is supported at each of its ends, i.e. in double shear by means of two mounting brackets 4 to which the shaft 3 is secured by means of captive nuts 5 and washers 6. Each of the opposed surfaces of the cones 1 is provided with relatively thin coverings or sleeves 7 of elastomeric material which support between them an annular shaped mount housing 8. The mount housing 8 is of annular form and is provided with opposed cone shaped depressions which afford bearing surfaces 9 which bear on respective ones of the sleeves 7 carried by the cones 1. The angle subtended by the inner angled surfaces 9 of the mount housing 8 is arranged to be more obtuse than the angle subtended by the outer surfaces of the sleeves 7 so that contact between the mount housing 8 and the sleeve 7 is only made at the outside edges of the mount housing 8. The amount of the normal contact area between the sleeve 7 and the mount housing 8 is determined by the spacing of the cones 1, this being determined by two ring nuts 10 which locate respectively in the outside ends of the cones 1 and which are provided with threaded axial holes which are closed at one end, both ends 11 of the hub 2 being threaded to receive the ring nuts 10 which are screwed fully on to the hub 2 so that the spacing of the cones 1 is determined effectively by the length of the hub 2.

In order to make the mounting arrangement suitable for use when submerged in a liquid, e.g. under water, longitudinal flutes 12 are provided in the surface of the elastomeric sleeves 7 so that the liquid is allowed entry to and exit from the interior cavity 13 of the arrangement. To a first order of magnitude, the volume of this cavity is, during operation, constant, because, for example, if the mount housing 8 is pressed downwards, the top of the cavity 13 is reduced while the bottom of the cavity 13 is enlarged. This feature prevents the temporary cessation of operation caused by hydraulic lock which occurs with some kinds of shock and vibration mounts when used in a liquid.

If the device is used in sea water, undesirable electrolytic action can be set up if the mount housing 1 is made of a different material from that of the hub 2 and shaft 3. This is reduced in the mount housing described by providing a close fitting sleeve 14 of insulating material around the hub 2, which reduces contact between the sea water and the hub 2. As mentioned previously, the hub 2 like the shaft 3 is made of steel, and its function is to greatly increase the stiffness of the shaft, to resist bending moments. An additional function as mentioned previously is to set the degree to which the cones 1 are spaced apart.

The basic action of the mounting arrangement described is that of an anti-vibration mount, in that structures fixed to the mount housing 8 are isolated from vibration transmitted via the mounting brackets 4, (or conversely). A further important feature of the design is that it will not appreciably amplify an applied shock and will withstand a shock of up to 500 g applied in either axial or radial directions without damage to its performance as an antivibration mount. Its general performance in respect of shock is that it produces either a small amplification or a small reduction, depending upon the magnitude and rate of application of the shock load. The mounting arrangement attenuates vibrations lying above a certain lower frequency limit $f_o$, this frequency being controlled by the natural resonant frequency $f_n$ of the mount. Altering the natural frequency changes both the frequency $f_o$ for which the attenuation is zero and the value of the attenuation at any higher frequency.

Physical parameters used in the design of the mounting arrangement to match a supporting structure of given mass to a required attenuation of vibration, within limits, are the quality, thickness and hardness of the elastomeric sleeves 7, and the angle of the cones 1. The quality, thickness and hardness of the elastomeric controls the natural resonant frequency $f_n$. The cone angle also affects the resonant frequency but, much more importantly, it controls the relative effectiveness of the mount in the axial and radial directions. The cone angle can be chosen so as to make the characteristics in the radial and axial directions equal. A further parameter affecting the natural frequency of the mounting arrangement, is the spacing of the cones, as this affects the normal area of contact between the elastomer sleeve 7 and the mount housing 8. As mentioned previously this is controlled in practice by the length of the hub 2. An additional feature of the design is that to some extent the degree of vibration attenuation of the mount housing may be altered by changing the material of the elastomer sleeves 7. In an extreme case, the elastomer sleeves might be replaced by small springs of some kind. The duration or loss through any reason, of the elastomeric sleeves 7 carried by the cones 1 does not lead to collapse of the system as the mounting arrangement is self-captive.

To summarise, an anti-vibration mounting arrangement has been described having equal characteristics in all radial directions and capable of being designed to have the same characteristics in the axial direction. Such a mounting arrangement is therefore suitable for carrying loads in all radial directions and in the axial direction.

The mounting arrangement also electrically isolates the mounted assembly from the structure to which it is mounted, thus reducing the possibility of corrosion should the mounted equipment and the base structure be of non-compatible materials.

I claim:

1. A mounting arrangement comprising a first part including a pair of inwardly facing external cone surfaces supported on a common axis, a second part including a pair of outwardly facing internal cone shaped surfaces, the second part of said arrangement being mounted on the first part thereof with the same common axis so that each of the external cone surfaces coact with a respective one of the internal cone surfaces, and a resilient sleeve interposed between each of the coacting surfaces, said sleeve being secured to one of said surfaces and having a surface that is angled relative to the other of said surfaces such that contact between said sleeve and the other of said surfaces is made over only part of their surface areas adjacent the base of said other cone surfaces.

2. A mounting arrangement according to claim 1, in which the resilient sleeves are formed of elastomeric material.

3. A mounting arrangement according to claim 2, in which the sleeves are provided with longitudinally extending flutes therein.

4. A mounting arrangement according to claim 3, in which the first part of said arrangement comprises two cone members which respectively afford the external cone surfaces, a shaft for supporting the cone members and bracket means for supporting said shaft, and in which the second part is of annular form supported between the two cone members.

5. A mounting arrangement according to claim 4, comprising a hub member carried by said shaft for determining the spacing between said cone members.

6. A mounting arrangement according to claim 5, in which the hub member is provided with a central insulating sleeve.

* * * * *